US011175726B2

(12) United States Patent
Gray et al.

(10) Patent No.: US 11,175,726 B2
(45) Date of Patent: Nov. 16, 2021

(54) GESTURE ACTIONS FOR INTERFACE ELEMENTS

(71) Applicant: Amazon Technologies, Inc., Seattle, WA (US)

(72) Inventors: Timothy T. Gray, Seatttle, WA (US); Aaron Michael Donsbach, Seatttle, WA (US); Mark R. Privett, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/779,314

(22) Filed: Jan. 31, 2020

(65) Prior Publication Data

US 2020/0166988 A1 May 28, 2020

Related U.S. Application Data

(63) Continuation of application No. 14/746,574, filed on Jun. 22, 2015, now Pat. No. 10,564,806, which is a continuation of application No. 13/626,475, filed on Sep. 25, 2012, now Pat. No. 9,063,563.

(51) Int. Cl.
| | |
|---|---|
| *G06F 3/01* | (2006.01) |
| *G06F 3/0488* | (2013.01) |
| *G06F 3/041* | (2006.01) |
| *G06F 3/0482* | (2013.01) |
| *G06F 3/0484* | (2013.01) |

(52) U.S. Cl.
CPC ............... *G06F 3/01* (2013.01); *G06F 3/017* (2013.01); *G06F 3/041* (2013.01); *G06F 3/0482* (2013.01); *G06F 3/0488* (2013.01); *G06F 3/04842* (2013.01); *G06F 3/04883* (2013.01)

(58) Field of Classification Search
CPC ...... G06F 3/0482; G06F 3/04883; G06F 3/01; G06F 3/04842; G06F 3/041; G06F 3/0488; G06F 3/017
See application file for complete search history.

(56) References Cited

U.S. PATENT DOCUMENTS

| | | | |
|---|---|---|---|
| 6,094,197 A * | 7/2000 | Buxton | ................. G06F 3/0482 341/22 |
| 6,597,345 B2 | 7/2003 | Hirshberg | |
| 8,402,391 B1 | 3/2013 | Doray et al. | |
| 9,063,563 B1 | 6/2015 | Gray et al. | |
| 2003/0014239 A1 | 1/2003 | Ichbiah et al. | |
| 2004/0021647 A1 | 2/2004 | Iwema et al. | |

(Continued)

*Primary Examiner* — Charles V Hicks
(74) *Attorney, Agent, or Firm* — Polsinelli PC (57) ABSTRACT

A user interface (UI) enables a user to access a set of options relating to an element of the UI by contacting a region of a touchscreen, or hovering a feature over the region, associated with that element. Upon contacting or hovering for at least a determined period of time, an arranged set of options is displayed and the user can swipe or move the feature in a specified direction to select a specific option. The options can be the same for each instance of a type of item. When a user learns the direction of one of these options, the user does not have to contact or hover long enough to bring up the menu, but can contact or hover long enough to indicate the element of interest and then perform the appropriate motion, which can cause the action to be performed without first displaying the menu.

18 Claims, 8 Drawing Sheets

(56) References Cited

U.S. PATENT DOCUMENTS

| | | |
|---|---|---|
| 2011/0084914 A1 | 4/2011 | Zalewski |
| 2012/0120002 A1 | 5/2012 | Ota |
| 2012/0200510 A1 | 8/2012 | Pettey et al. |
| 2014/0002375 A1* | 1/2014 | Rydenhag ............ G06F 3/04883 |
| | | 345/173 |
| 2016/0048304 A1 | 2/2016 | Niranjani et al. |

* cited by examiner

GESTURE ACTIONS FOR INTERFACE ELEMENTS

CROSS-REFERENCE TO RELATED APPLICATIONS

This application is a continuation of U.S. application Ser. No. 14/746,574, filed Jun. 22, 2015, entitled "GESTURE ACTIONS FOR INTERFACE ELEMENTS", which is a continuation of U.S. application Ser. No. 13/626,475, filed Sep. 25, 2012, now U.S. Pat. No. 9,063,563, entitled "GESTURE ACTIONS FOR INTERFACE ELEMENTS"; which is hereby expressly incorporated herein by reference in its entirety.

BACKGROUND

Users are increasingly utilizing computing devices to obtain various types of information and perform various tasks. In many cases, performing a task involves a user navigating to an interface element associated with an application, opening the application, locating the option to perform the task, and then selecting that option. Such approaches can require many steps, which can be frustrating for a user when a user performs certain tasks repeatedly. Further, users are increasingly relying on portable computing devices such as smart phones and tablet computers, which typically have relatively small touch screens to be used for input. The elements displayed on such a device can be relatively small, such that having to make multiple selections to perform an action can be difficult. Further, additional actions on the display screen tend to cause more oil and debris to be deposited on the screen, which can decrease the quality of the user experience.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to managing interactions with user interface (UI) elements, as well as enabling a user to perform various tasks, in an electronic environment. In particular, various embodiments enable a set of options of a radial menu (or other arrangement) to be displayed in response to a user contacting, hovering over, or otherwise indicating a UI element for at least a determined period of time. The options that are displayed each can correspond to a type of action that can be performed with respect to the type of element. The user can swipe or otherwise move a finger or other feature contacting, or hovering over, the element in a direction corresponding to one of the options in order to cause the corresponding action to be performed. In at least some embodiments, a user can learn the direction of an option for a type of element, and can swipe or move in that direction, upon contacting or hovering over an element, before such time as the menu is displayed. Such an approach enables a user to cause certain actions to be performed without multiple touch actions or other such approaches.

Various other functions and advantages are described and suggested below as may be provided in accordance with the various embodiments.

Figure 1A:
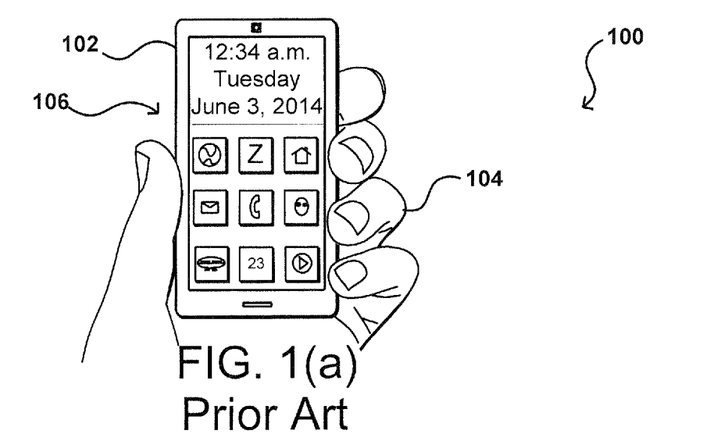
FIGS. 1(a), 1(b), and 1(c) illustrate a conventional approach to performing an action with respect to an interface element.

FIG. 1(a) illustrates an example situation 100 wherein a graphical user interface (GUI) 106 is rendered on display element of a computing device 102. The computing device 102 can be any appropriate device, such as a smart phone, tablet computer, or personal data assistant, among other such options. In this example, the user is holding the computing device in one of the user's hands 104. In this example the interface includes a plurality of icons that each correspond to an application or other instance of content on the computing device. If the user wants to interact with one of these instances, the user can contact the icon using a thumb or finger, for example, in order to cause the application to open, the instance to be selected, or another such action to occur.

Figure 1B:
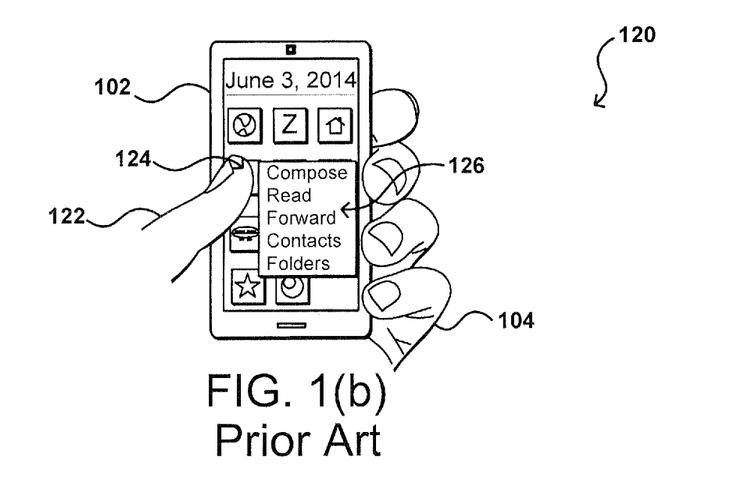

In some embodiments, there can be multiple options that can be performed with respect to one of these instances. For example, a file might be able to be viewed, sent to an application, deleted, copied, etc. As illustrated in the situation 120 of FIG. 1(b), the user in some embodiments can contact or "hold" the user's finger, thumb 122, or another selection object on the icon or element 124 for the instance, which can cause what is often referred to as a "marking menu" 126 to appear near the element on the interface. As known in the art, right-clicking a mouse when a cursor is positioned with respect to the element, or performing another such action, can cause the marking menu to appear as well. In this example the element 124 is an icon for an email application and the marking menu includes actions that can be taken with respect to the email application. For example, the user can lift the user's thumb 122 from the element 124 and can select one of the options by pressing on the desired option of the marking menu 126.

Figure 1C:
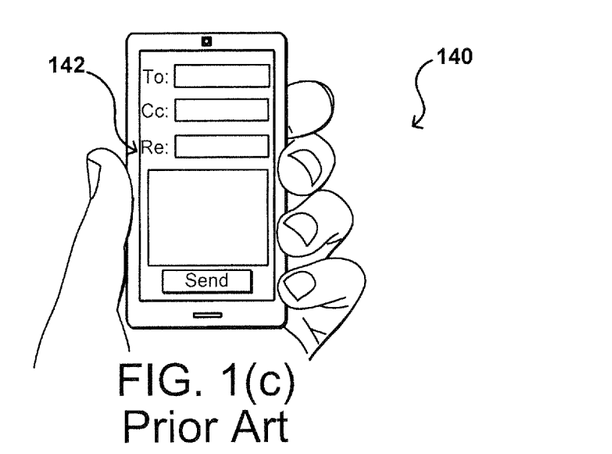

In this example, the user lifts the user's thumb and selects an option to compose a new email message using the email application. Accordingly, a new message interface 142 is rendered on the display of the computing device, as illustrated in the example situation 140 of FIG. 1(c). While such an approach can be faster and/or easier for a user than opening the application and then selecting an option to compose a new message, the approach still requires multiple touches or selections by the user, which as mentioned can be difficult for users of portable devices with small display screens. For other users, it might be desired to reduce the amount of inputs or separate actions needed to perform specific tasks that the user might perform repeatedly, in order to save time and effort, as well as to improve the overall user experience.

Systems and methods in accordance with various embodiments can utilize interface approaches that do not require such separate selection actions. Further, in at least some embodiments a user can cause an action to be performed with respect to an element, application, file, or other instance of content without having a menu displayed and/or selecting an option from a menu. Still other embodiments enable a user to access a menu when the user wants to determine which actions are available for a certain element or how to access those actions. The selections or input can be provided by the user contacting the screen or making specific motions or gestures with respect to the device, among other such options.

Figure 2A:
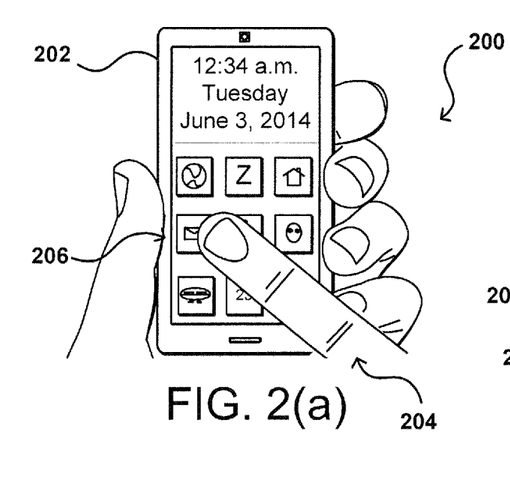
FIGS. 2(a), 2(b), 2(c), and 2(d) illustrate an approach to performing an action with respect to an interface element that can be utilized in accordance with various embodiments.

As an example, FIG. 2(a) illustrates an example situation 200 wherein a user is able to provide input with respect to an element 206 displayed on a display of a computing device 202. In this example, the user is able to position a fingertip of a finger 204, or another such feature of the user or object being held by the user, in a position or location with respect to the element such that the device can determine the input. The positioning can include, for example, touching the display screen at a location associated with the element or holding the finger for a period of time (e.g., "hovering") at a distance from a location associated with the element in order to cause the device to determine the input. As illustrated in FIG. 2(a), the user can quickly tap or hover long enough to cause the element to be selected, which in this example could cause an associated email application to open, or at least become a primary open application, on the computing device, among other potential actions.

If the user wants to perform a specific action with respect to that element 206, however, the user can continue to hold or hover the finger in approximately the same location for a longer period of time. If the finger is held in that location for at least a threshold period of time, such as will be referred to as a "menu threshold" in this example, a radial menu 222 (or other such arrangement) of options can be displayed with respect to the element, as illustrated in the example situation 220 of FIG. 2(b). In this example the options are displayed as balloons, bubbles, or other such selectable elements, but it should be understood that any appropriate shape, size, or format can be used within the scope of the various embodiments. The options can appear instantly, fade in, fly in through animation, or otherwise be rendered. In this example the options are connected by graphical lines to the appropriate element to help indicate to the user that the user can swipe, slide, or otherwise motion over to one of those options in order to perform the associated action. In this example, four different options are displayed around the element 206, where each of the options corresponds to an action that can be taken and/or performed with respect to the element. For example, as discussed previously, for an email application there can be actions suggested such as to compose a new message or forward a recently received message, among other such options. In this example, each radial interface can include a common number of options, such as four options, arranged in a common arrangement, such as an (upper-right, upper-left, lower-right, lower-left) arrangement or (northeast, northwest, southeast, southwest) arrangement, among other such possibilities. It should be understood, however, that the number and arrangement of options can vary among different embodiments, and in some cases different types of elements might have different numbers or arrangements of options or other such content.

Figure 2B:
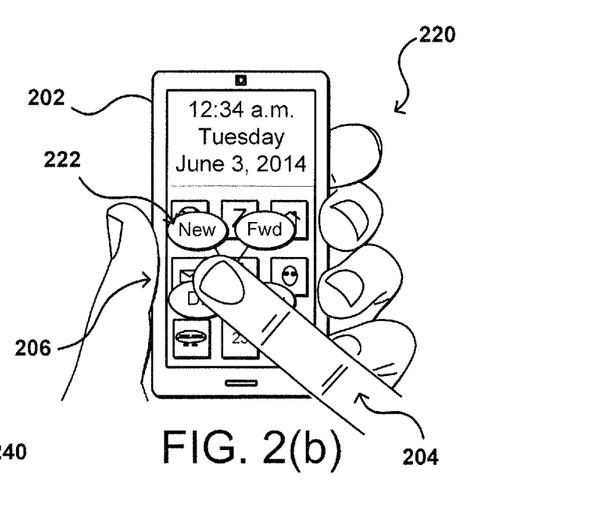
Figure 2C:
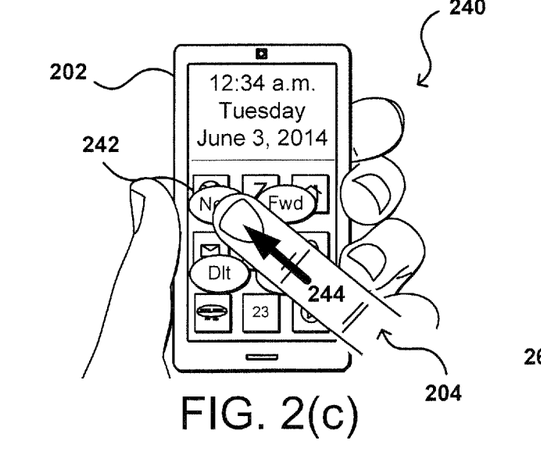
Figure 2D:
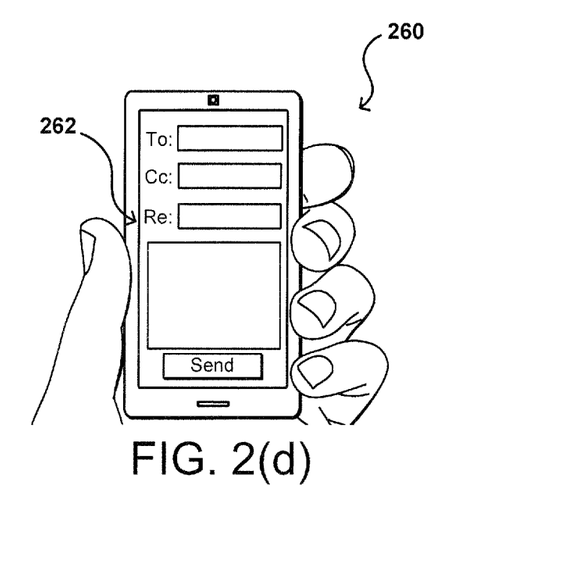

As illustrated in the situation 240 of FIG. 2(c), a user can move the finger 204 or other feature or object in the direction 244 of the option of interest, in order to have the desired action performed. In this example, the user moves the finger 204 selecting the element 206 in the direction of an option 242 to compose a new message. As can be seen, if the user is contacting the screen in order to select the element, the user does not have to lift the finger and press again in a specific location to select the desired option, but instead can move or "swipe" the finger across the screen in approximately the direction of the option in order to cause that option to be selected. As discussed later herein, the direction 244 does not have to be precise, as a general range of angles or "quadrant" in that direction can be used to select the option. Further, if the user is hovering over the element to bring up the menu, the user can make a motion or gesture towards that option in approximately the corresponding location to select that option. Such an approach enables a user to quickly cause an action to be performed with respect to an element on the GUI (or elsewhere on the device) without having to contact the device multiple times and precisely select listed options, or perform other such actions. As illustrated in the example situation 260 of FIG. 2(d), the same compose message interface 262 can be displayed as was displayed in FIG. 1(c), but as the result of a much easier to execute action on behalf of the user.

As with various marking menus, the options provided for an item or element can be contextual, with the options including actions that make sense for the item or element. For example, if the element is a hyperlink the options might be to open the link in a browser, copy the link, forward the link, or print the content at the link. For a media file, the options might be to play the file, copy the file, download the file, or share the file on a social networking site. For a phone application, the options might be to place a call, check voicemail, check a call log, or open a contact list. For a game icon, the options might include games that can be played or save locations in a particular game. Various other such options can be utilized with other types of content as well within the scope of the various embodiments.

In at least some of these embodiments, the options displayed can be set for certain types of items or elements. In such instances, the same options can be in the same general direction for each element of that type. An advantage to such an approach is that the user can learn the direction of each option for a type of element, such that there may be no need to display the menu of options for a given element. Further, if the menu does not have to be displayed, the user might not have to hold or hover a finger or other element as long in order to indicate to the device that the radial menu should be displayed for that element.

Figure 3A:
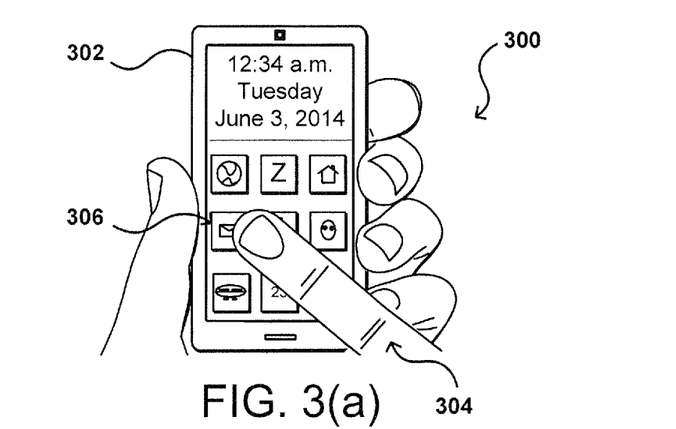
FIGS. 3(a), 3(b), and 3(c) illustrate an approach to performing an action with respect to an interface element that can be utilized in accordance with various embodiments.

FIG. 3(a) illustrates an example situation 300 similar to that illustrated in FIG. 2(a), wherein a user is able to provide input with respect to an element 306 displayed on a display of a computing device 302. As discussed previously, the user is able to position a fingertip of a finger 304, or another such feature of the user or object being held by the user, in a position or location with respect to the element such that the device can determine the input. In this example, the user can still perform a quick tap or hover to select the element 306, or can hold down or hover for at least a menu threshold amount of time in order to bring up the radial menu of options. In at least some embodiments, however, the user can select an action or option for an element by holding or hovering longer than may be required to select the element, but not as long as may be required to bring up the radial menu. In this example, the finger must be positioned with respect to the element for at least a threshold amount of time, herein referred to as an "action" threshold, in order to indicate to the device that the user does not intend to make a simple selection of the element, but wishes to cause something else to occur with respect to that element.

Figure 3B:
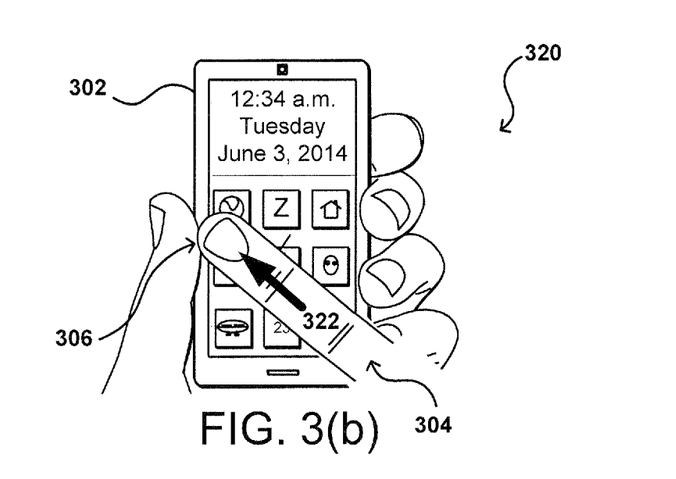

For example, in the situation 320 of FIG. 3(b) the user has held the finger 304 in position for at least the action threshold amount of time. If the user knows the direction in which a desired action is located, such as to the "upper-left" in the figure, the user can move or swipe the finger 304 in that direction 322 in order to cause that action or option to be selected. The direction corresponds to the general direction of the option had the user held the finger in place long enough to bring up the radial menu, as was illustrated in FIG. 2(b). In some embodiments, the display or rendering of the element might change when the finger has been held in position with respect to that element long enough to meet or exceed the action threshold, such that the user knows that a swipe action can be used to cause the action to be performed. In other embodiments, the user will learn how long to hold in order to allow for a swipe to select an action for an element. In at least some embodiments the device can monitor the motion of the finger, and if the finger contacts an element and makes a swipe motion before being lifted away from the display screen, or before being drawn back in the case of a hover, the action might be selected regardless of the amount of hold or hover time, as long as the hold or hover occurs for less than the menu threshold time.

Figure 3C:
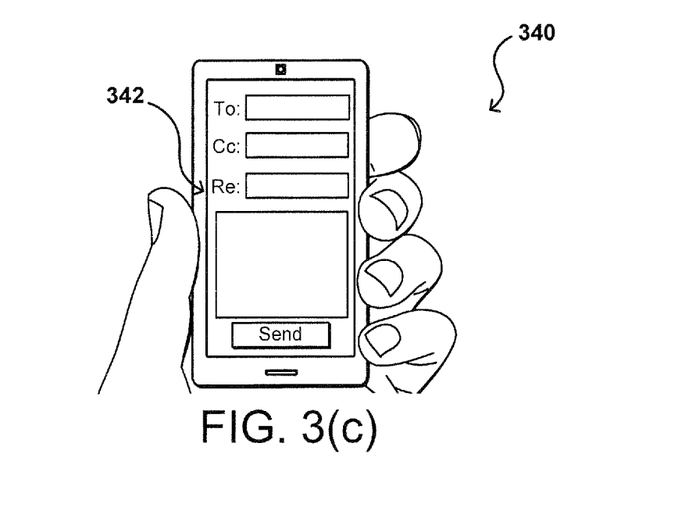

If the user cannot remember the direction of an option, of the available options, for an element, the user can continue to hold until the menu is displayed, as illustrated in FIG. 2(b), wherein the user can swipe to select one of the options. As illustrated in FIG. 3(b), however, if the user knows that for every email icon an upper-left motion corresponds to a "compose new message" option, for example, the user can touch or hover to select and then swipe or motion in the appropriate direction, without having to wait for a menu to be displayed. As illustrated, such a motion can also bring up a compose message interface 342, as illustrated in the example situation 340 of FIG. 3(c).

In some embodiments, there might be a default set of actions for all types of user-selectable graphical elements, where each of those elements might be associated with an application, file, or function on a computing device. For example, a certain direction might always select an option to share an application or file associated with a graphical element to a social media site. In other embodiments, one or more directions might correspond to the same option for each type of element, but one or more other directions might differ per element, such as a different option for an application icon than for an image thumbnail. The options provided for each type of element can be configurable by a user, application, developer, or other such party. In some embodiments, the selection of an option might bring up another menu, which itself might be a radial menu with options. For example, if a user selects an option to share an item and has an account with four social media sites, a second set of options might be displayed asking the user to specify the site(s) on which to share the element, or some aspect of the element.

Figure 4A:
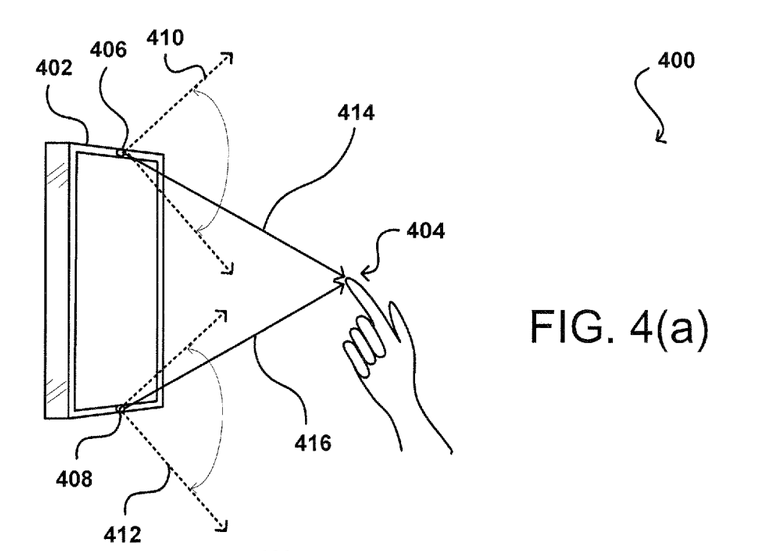
FIGS. 4(a), 4(b), 4(c), and 4(d) illustrate example approaches to locating a feature of a user that can be utilized in accordance with various embodiments.

In order to determine the location of one or more features of the user with respect to a display or other such element of a computing device, a number of potential approaches can be used. FIGS. 4(a), (b), (c), and (d) illustrate one example approach to determining a relative distance and/or location of at least one feature of a user that can be utilized in accordance with various embodiments. In this example, input can be provided to a computing device 402 by monitoring the position of the user's fingertip 404 with respect to the device, although various other features can be used as well as discussed and suggested elsewhere herein. In some embodiments, a single camera can be used to capture image information including the user's fingertip, where the relative location can be determined in two dimensions from the position of the fingertip in the image and the distance determined by the relative size of the fingertip in the image. In other embodiments, a distance detector or other such sensor can be used to provide the distance information. The illustrated computing device 402 in this example instead includes at least two different image capture elements 406, 408 positioned on the device with a sufficient separation such that the device can utilize stereoscopic imaging (or another such approach) to determine a relative position of one or more features with respect to the device in three dimensions. Although two cameras are illustrated near a top and bottom of the device in this example, it should be understood that there can be additional or alternative imaging elements of the same or a different type at various other locations on the device within the scope of the various embodiments. Further, it should be understood that terms such as "top" and "upper" are used for clarity of explanation and are not intended to require specific orientations unless otherwise stated. In this example, the upper camera 406 is able to see the fingertip 404 of the user as long as that feature is within a field of view 410 of the upper camera 406 and there are no obstructions between the upper camera and those features. If software executing on the computing device (or otherwise in communication with the computing device) is able to determine information such as the angular field of view of the camera, the zoom level at which the information is currently being captured, and any other such relevant information, the software can determine an approximate direction 414 of the fingertip with respect to the upper camera. In some embodiments, methods such as ultrasonic detection, feature size analysis, luminance analysis through active illumination, or other such distance measurement approaches can be used to assist with position determination as well.

In this example, a second camera is used to assist with location determination as well as to enable distance determinations through stereoscopic imaging. The lower camera 408 in FIG. 4(a) is also able to image the fingertip 404 as long as the feature is at least partially within the field of view 412 of the lower camera 408. Using a similar process to that described above, appropriate software can analyze the image information captured by the lower camera to determine an approximate direction 416 to the user's fingertip. The direction can be determined, in at least some embodiments, by looking at a distance from a center (or other) point of the image and comparing that to the angular measure of the field of view of the camera. For example, a feature in the middle of a captured image is likely directly in front of the respective capture element. If the feature is at the very edge of the image, then the feature is likely at a forty-five degree angle from a vector orthogonal to the image plane of the capture element. Positions between the edge and the center correspond to intermediate angles as would be apparent to one of ordinary skill in the art, and as known in the art for stereoscopic imaging. Once the direction vectors from at least two image capture elements are determined for a given feature, the intersection point of those vectors can be determined, which corresponds to the approximate relative position in three dimensions of the respective feature.

In some embodiments, information from a single camera can be used to determine the relative distance to a feature of a user. For example, a device can determine the size of a feature (e.g., a finger, hand, pen, or stylus) used to provide input to the device. By monitoring the relative size in the captured image information, the device can estimate the relative distance to the feature. This estimated distance can be used to assist with location determination using a single camera or sensor approach.

Figure 4B:
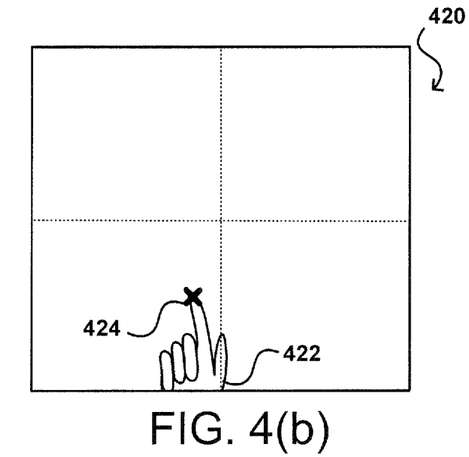
Figure 4C:
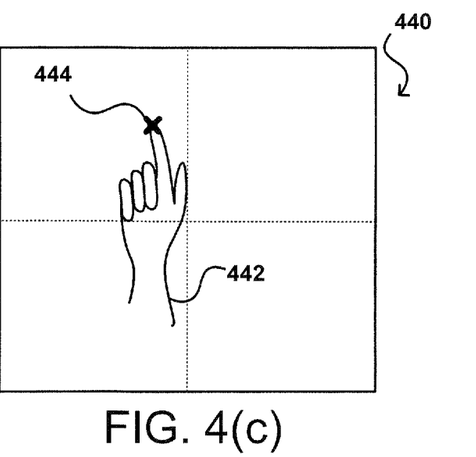

Further illustrating such an example approach, FIGS. 4(b) and 4(c) illustrate example images 420, 440 that could be captured of the fingertip using the cameras 406, 408 of FIG. 4(a). In this example, FIG. 4(b) illustrates an example image 420 that could be captured using the upper camera 406 in FIG. 4(a). One or more image analysis algorithms can be used to analyze the image to perform pattern recognition, shape recognition, or another such process to identify a feature of interest, such as the user's fingertip, thumb, hand, or other such feature. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. Upon identifying the feature, here the user's hand 422, at least one point of interest 424, here the tip of the user's index finger, is determined. As discussed above, the software can use the location of this point with information about the camera to determine a relative direction to the fingertip. A similar approach can be used with the image 440 captured by the lower camera 408 as illustrated in FIG. 4(c), where the hand 442 is located and a direction to the corresponding point 444 determined. As illustrated in FIGS. 4(b) and 4(c), there can be offsets in the relative positions of the features due at least in part to the separation of the cameras. Further, there can be offsets due to the physical locations in three dimensions of the features of interest. By looking for the intersection of the direction vectors to determine the position of the fingertip in three dimensions, a corresponding input can be determined within a determined level of accuracy. If higher accuracy is needed, higher resolution and/or additional elements can be used in various embodiments. Further, any other stereoscopic or similar approach for determining relative positions in three dimensions can be used as well within the scope of the various embodiments.

As can be seen in FIG. 4(a), however, there can be a region near the surface of the screen that falls outside the fields of view of the cameras on the device, which creates a "dead zone" where the location of a fingertip or other feature cannot be determined (at least accurately or quickly) using images captured by the cameras of the device.

Figure 4D:
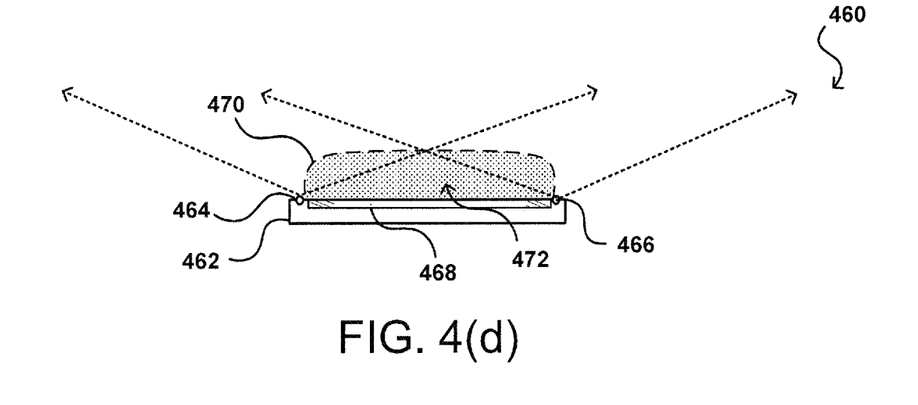

FIG. 4(d) illustrates an example configuration 460 wherein the device 462 includes a pair of front-facing cameras 464, 466 each capable of capturing images over a respective field of view. If a fingertip or other feature near a display screen 468 of the device falls within at least one of these fields of view, the device can analyze images or video captured by these cameras to determine the location of the fingertip. In order to account for position in the dead zone outside the fields of view near the display, the device can utilize a second detection approach, such as by using a capacitive touch detection component as known or used in the art with various touch screens. A capacitive touch detection component can detect position at or near the surface of the display screen. By adjusting the parameters of the capacitive touch detection component, the device can have a detection range 470 that covers the dead zone and also at least partially overlaps the fields of view. Such an approach enables the location of a fingertip or feature to be detected when that fingertip is within a given distance of the display screen, whether or not the fingertip can be seen by one of the cameras. Other location detection approaches can be used as well, such as ultrasonic detection, distance detection, optical analysis, and the like.

In at least some embodiments swiping motions might be used for other input on a computing device. For example, the device might enable a user to scroll a GUI layout, page, or canvas in an up or down direction by making a corresponding up or down motion with the user's finger, or scroll right or left with corresponding right or left motions. In some embodiments, such motions can be the default when the user is contacting an area of the interface that does not correspond to an element. Such an approach may not be ideal, however, as a user scrolling in a direction several times might not be careful about avoiding elements when starting such a motion, which can potentially cause an action for an element to be performed when the user was intending a scroll action. In some embodiments a scroll action might utilize less than the action threshold amount of time, but where that threshold is kept low to allow for fast gesture input, the time difference between a scroll motion and an action motion might be too subtle for at least some users, and can result in false input, which can degrade the user experience.

Figure 5A:
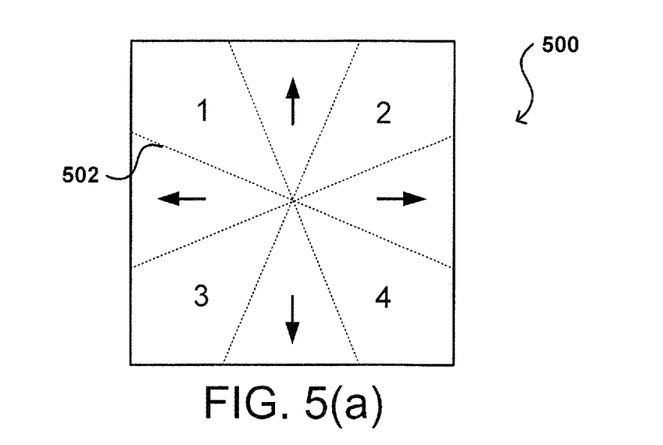
FIGS. 5(a), 5(b), and 5(c) illustrate example region or quadrant configurations that can be utilized in accordance with various embodiments.

Accordingly, approaches in accordance with various embodiments can utilize regions, quadrants, angular ranges, or other such zones or demarcations to differentiate between scroll motions and action motions. For example, FIG. 5(a) illustrates an example quadrant map 500 that can be used in accordance with various embodiments. In this example, a set of demarcation boundaries 502 are used to separate regions of motion that correspond to different inputs. For example, the quadrants to the top, bottom, right, and left contain arrows showing a direction of scrolling, navigation, or movement that correspond to motions detected in directions that fall within those quadrants. As should be understood, terms such as "top" and "left" are used for ease of explanation and are not intended to specify required orientations unless otherwise specified. Also as illustrated, the regions towards the corners of the map 500 include numbers that specify different options that can be selected, or actions performed, for an element. Thus, if a user in this example touches an area of the interface that corresponds to an element and motions substantially to the right, the software and/or hardware on the device can determine that the user wants to scroll or move to the right in the interface. If, however, the motion is sufficiently to the upper right, the device can determine that the user wishes to select option or action number two, which is a specific option or action for a type of the element as discussed herein.

In many cases a user will be making motions with a thumb or finger. Since each of these features contains a single pivot point, scroll motions generally will not be directly up and down or right and left, but will have some angle or trajectory based at least in part upon that pivot point. So, for example, a fingertip of a user's right hand making a motion to the left may tend to also move somewhat downward, depending on the orientation of the hand, and when moved to the right may also have an upward component. Such natural deviations can potentially cause problems interpreting input between, for example, a westward motion and a north-westward motion.

Figure 5B:
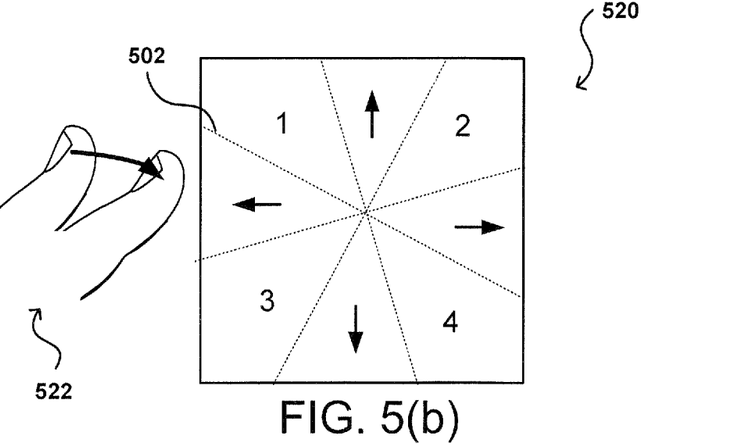

Accordingly, approaches in accordance with at least some embodiments can provide for a slight rotation or adjustment of the quadrant map to account for this natural motion. In the example map 520 of FIG. 5(*b*), the device has determined that the user is using a feature on the user's left hand 522. Accordingly, the demarcation boundaries 502 of the map are rotated slightly clockwise in order to account for the natural motion due to the pivot point. If the feature is located to be associated with the user's right hand, the boundaries might be rotated to the left, the amount of rotation or other distortion can also vary by user, among other such factors.

Figure 5C:
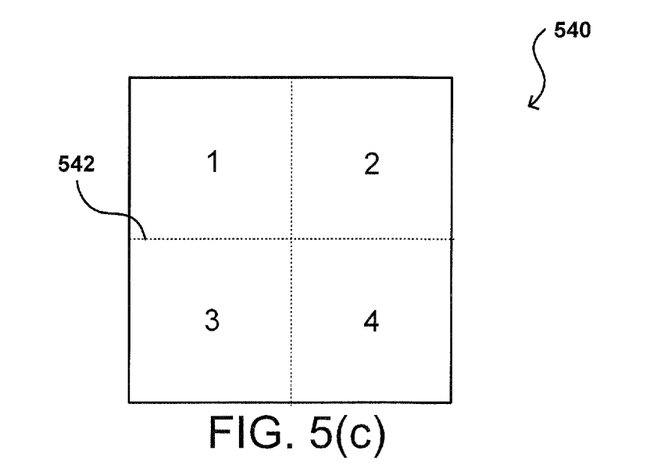

In some situations the interface canvas might not be scrollable. In such a case, the action boundaries 542 can be expanded, as illustrated in the map 540 of FIG. 5(*c*), such that the action motions of the user do not have to be as precise to be interpreted correctly. Various other arrangements, types or shapes of maps, or numbers of options can be used as well within the scope of the various embodiments.

Figure 6:
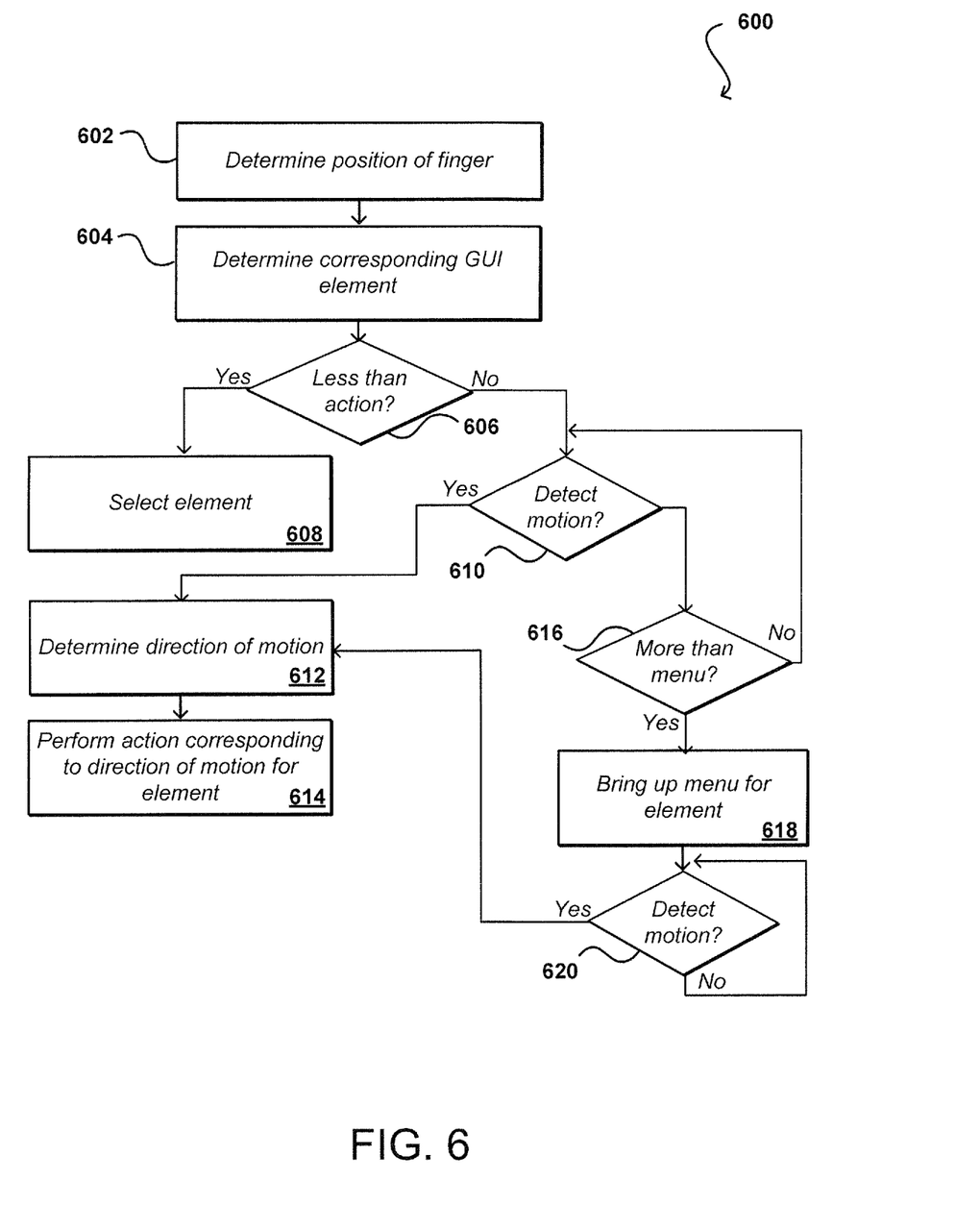
FIG. 6 illustrates an example process for determining an action to take in response to a user input that can be utilized in accordance with various embodiments.

FIG. 6 illustrates an example process 600 for enabling a user to select an action to be performed with respect to an element that can be utilized in accordance with various embodiments. It should be understood that there can be additional, fewer, or alternative steps performed in similar or alternative orders, or in parallel, within the scope of the various embodiments unless otherwise stated. In this example, a position of a finger of a user is determined 602 with respect to a display element of a computing device. As discussed, other features can be located as well, such as a thumb or hand position, as well as the location of an object being held by the user, gaze direction of the user, etc. In addition, an element of a graphical user interface displayed on the display element that corresponds to the position of the finger can be determined 604. If the finger touches or hovers over the display element at a location associated with the element, or makes a gesture at a location associated with the element, among other such options, a determination can be made 606 as to whether a length of the touch or hover lasted for less than an action threshold amount of time. If so, a conventional selection of that element can be determined 608 by the device. If the touch or hover lasts at least as long as the action threshold, a determination can be made as to whether a motion in an appropriate direction is detected 610. As discussed, these motions can correspond to scroll directions, directions of options or actions for the current element, etc. If motion is detected, the direction of the motion is determined 612 and an action corresponding to that direction is performed 614 (or caused to be performed) corresponding to the currently selected element.

A determination can also be made 616 as to whether an amount of time for the contact or hover at least meets a menu threshold amount of time. If so, a radial menu of options or actions can be displayed 618 with respect to the element. As discussed, the options or actions displayed can be selected based at least in part upon a context or type of element, among other such aspects. If motion is detected 620 while the menu is displayed, the motion can be treated the same as if the motion was performed before the menu was displayed, with the direction being determined and the corresponding action performed. If none of these motions is detected and the hover or contact stops, the process can stop without performing or selecting any options.

It should be understood that other selection mechanisms can be used as well. For example, a selection gesture does not need to include a hover near the screen but can correspond to a motion performed away from the screen, as may be detected by at least one camera or sensor. The motion can be with respect to a mapped region or can involve pointing at an element and then making the appropriate motion. Other input methods such as gaze tracking, head tracking, voice input, and other approaches can be used as well within the scope of the various embodiments.

Figure 7:
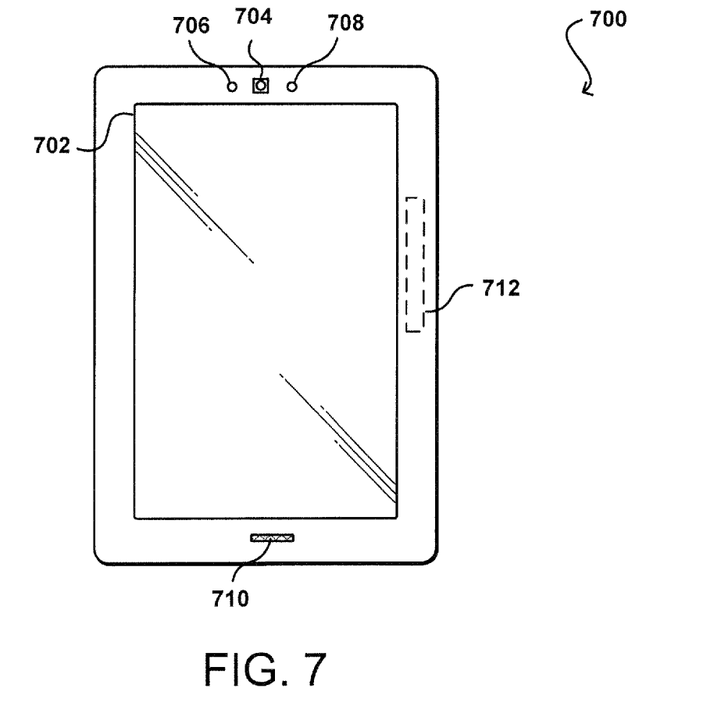
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish-eye lens, that enables the camera to capture images over a wide range of angles, such as 170 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device, music playing near the device, etc. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device. In some embodiments, a device can start analyzing image information when movement of the device is detected using one of these sensors. In other embodiments, a user can provide input to the device by tilting the device, shaking the device, or performing another such motion or action.

Figure 8:
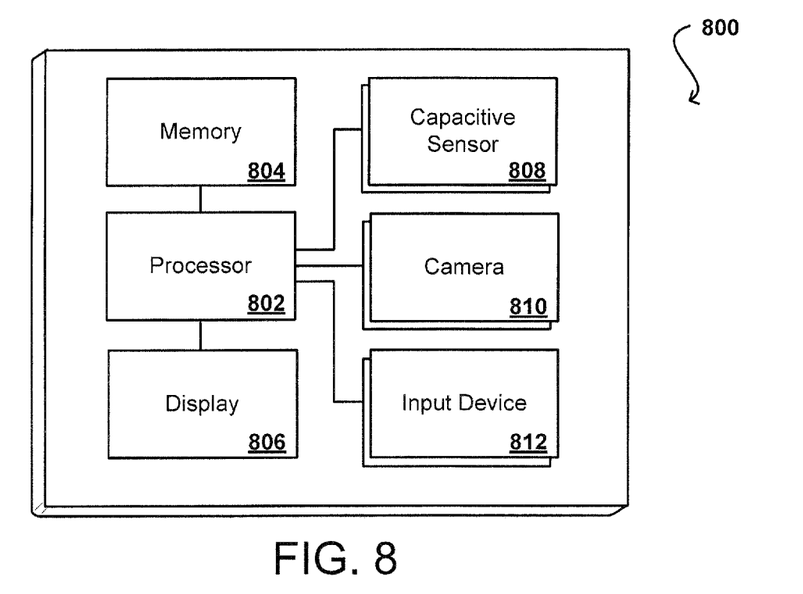
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include a display element 806, such as a touch screen or liquid crystal display (LCD), although devices such as portable media players might convey information via other means, such as through audio speakers. As discussed, the device in many embodiments will include at least one media capture element 808 such as a camera or infrared sensor that is able to image projected images or other objects in the vicinity of the device, or an audio capture element able to capture sound near the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can include at least one mono or stereo microphone or microphone array, operable to capture audio information from at least one primary direction. A microphone can be a uni- or omni-directional microphone as known for such devices.

In some embodiments, the computing device 800 of FIG. 8 can include one or more communication components 810, such as a Wi-Fi, Bluetooth, RF, wired, or wireless communication system. The device in many embodiments can communicate with a network, such as the Internet, and may be able to communicate with other such devices. In some embodiments the device can include at least one additional input element 812 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device also can include at least one orientation or motion sensor. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor, whereby the device can perform any of a number of actions described or suggested herein.

Figure 9:
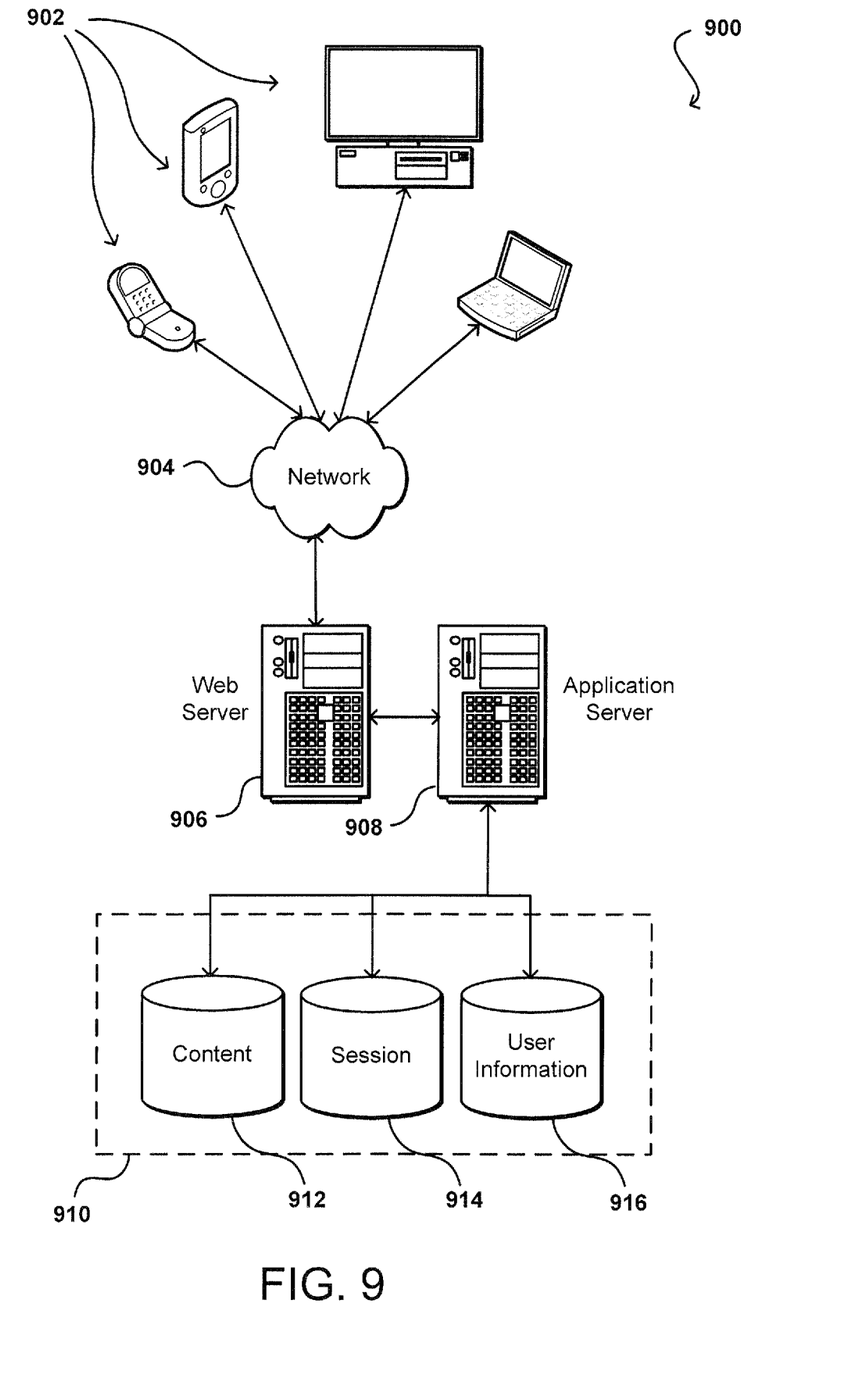
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    displaying, via a processor, a user interface element on a user interface of a computing device;
    generating first contact data corresponding to a first contact on a first region of the user interface that includes the user interface element, the first contact occurring for a first period of time;
    determining that the first period of time exceeds a first threshold amount of time for launching an application corresponding to the user interface element;
    displaying, for a second period of time, a set of first options that are common to multiple user interface elements, and at least one second option that corresponds to the user interface element, the at least one second option representing actions associated with the user interface element that is included in the first region;
    determining that the first contact with the first region of the user interface is continuous during the first period of time and the second period of time;
    generating second contact data corresponding to a second contact on a second region of the user interface during the second period of time, the second region including at least one option of the set of first options or the at least one second option, wherein a difference between the first contact data and the second contact data represents a contact movement from the first region to the second region; and
    activating the option corresponding to the second contact data.

2. The computer-implemented method of claim 1, further comprising determining that the contact movement from the first region to the second region stops in the second region.

3. The computer-implemented method of claim 1, wherein the at least one second option composes a new message.

4. The computer-implemented method of claim 1, wherein the at least one second option plays media content.

5. The computer-implemented method of claim 1, wherein the set of first options is a marking menu.

6. The computer-implemented method of claim 1, wherein the set of first options are radially arranged with respect to the first region.

7. The computer-implemented method of claim 1, wherein the first period of time corresponds to a menu threshold.

8. The computer-implemented method of claim 1, wherein the second period of time corresponds to an action threshold.

9. The computer-implemented method of claim 1, wherein the contact movement from the first region to the second region is a swipe from the first region to the second region.

10. A computing system, comprising:
    at least one processor;
    at least one user interface; and
    memory including instructions that, upon being executed by the at least one processor, causes the computing system to:
        display a user interface element on the user interface;
        generate first contact data corresponding to a first contact on a first region of the user interface that includes the user interface element, the first contact occurring for a first period of time;
        determine that the first period of time exceeds a first threshold amount of time for launching an application corresponding to the user interface element;
        display, for a second period of time, a set of first options that are common to multiple user interface elements, and at least one second option that corresponds to the user interface element, the at least one second option representing actions associated with the user interface element that is included in the first region;
        determine that the first contact with the first region of the user interface is continuous during the first period of time and the second period of time;
        generate second contact data corresponding to a second contact on a second region of the user interface during the second period of time, the second region including at least one option of the set of first options or the at least one second option, wherein a difference between the first contact data and the second contact data represents a contact movement from the first region to the second region; and
        activate the at least one option corresponding to the second contact data.

11. The computing system of claim 10, wherein the instructions that, upon being executed by the at least one processor, further causes the computing system to:
    determine that the contact movement from the first region to the second region stops in the second region.

12. The computing system of claim 10, wherein the at least one second option composes a new message.

13. The computing system of claim 10, wherein the at least one second option plays media content.

14. The computing system of claim 10, wherein the set of first options is a marking menu.

15. The computing system of claim 10, wherein the set of first options are radially arranged with respect to the first region.

16. The computing system of claim 10, wherein the first period of time corresponds to a menu threshold.

17. The computing system of claim 10, wherein the second period of time corresponds to an action threshold.

18. The computing system of claim 10, wherein the contact movement from the first region to the second region is a swipe from the first region to the second region.

\* \* \* \* \*